May 8, 1945.  L. OSKOW  2,375,489
PEELING DEVICE
Filed June 24, 1944
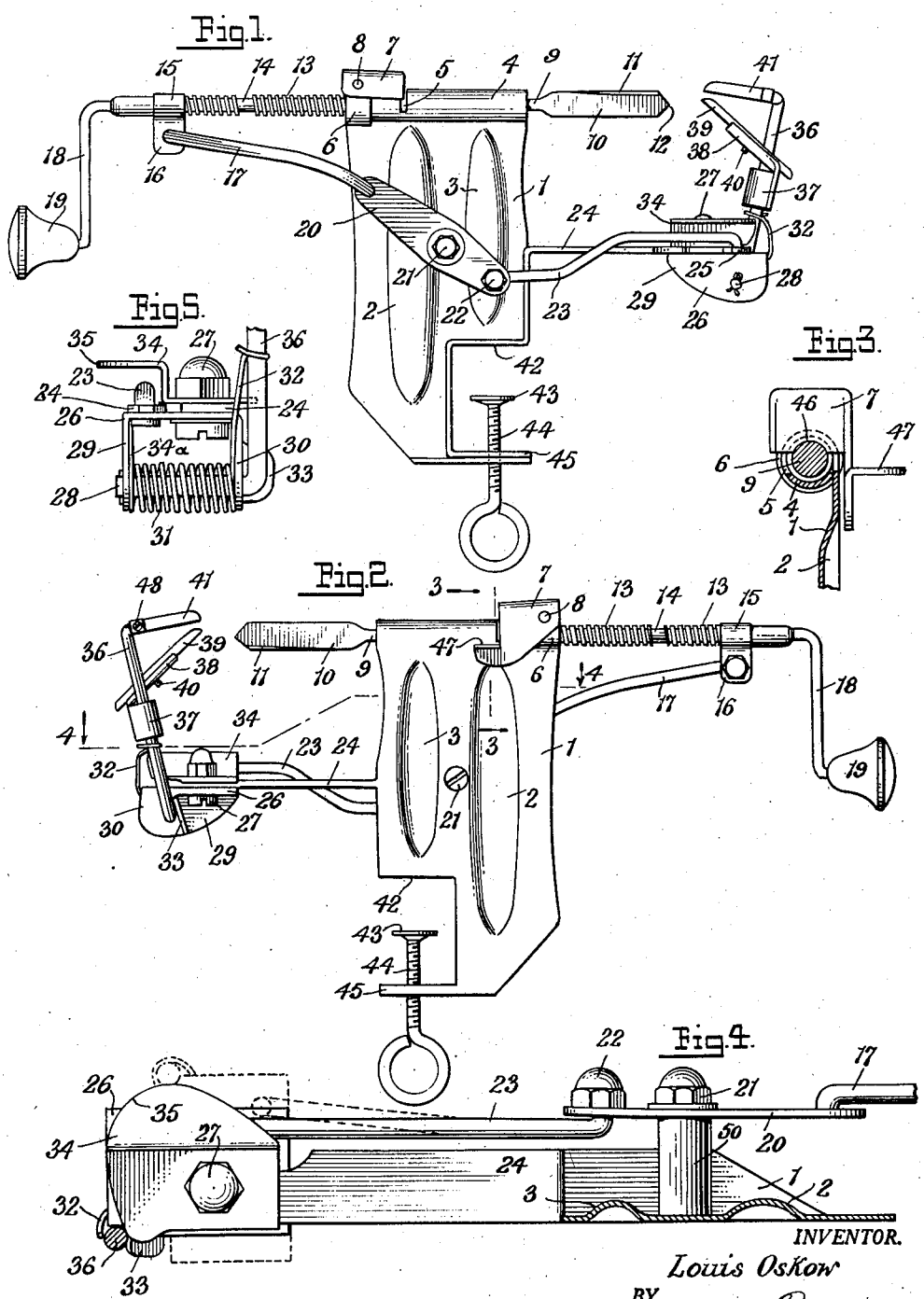

Patented May 8, 1945

2,375,489

UNITED STATES PATENT OFFICE 2,375,489

PEELING DEVICE

Louis Oskow, New York, N. Y.

Application June 24, 1944, Serial No. 541,888

5 Claims. (Cl. 146—43)

This invention relates to a device for paring or peeling potatoes, apples or other fruits or vegetables, and has for its primary object the provision of an inexpensive, simply constructed and effective device which will speedily pare potatoes, fruits and vegetables uniformly and rapidly.

The invention contemplates the provision of means by which the object to be peeled is rotated by a rotative spindle and is simultaneously moved forward, while a resiliently mounted cutter moves over the irregular shape of the object and removes a peeling of uniform but regulatable shape from the same.

An object of the present invention is to provide means by which the fruit or vegetable may be easily placed in position for peeling; of means by which the paring operation may, whenever desired, be repeated over any particular part or area of the object being pared; of means by which the parts of the device may be quickly moved to a position permitting the detachment of the peeled object whereby very speedy adjustment and peeling is possible.

The invention further contemplates the provision of many of the parts of the device of such form that they may be made from sheet-metal, whereby a light-weight, economically manufactured device is the result, thus placing the purchase of a device of this character within the means of the average housewife and rendering it usable in the kitchen.

In the accompanying drawing, wherein an embodiment of the invention is shown, Fig. 1 is a side elevation of the peeling device; Fig. 2 is a view of the opposite side of the device; Fig. 3 is a sectional view on the line 3—3 of Fig. 2, looking in the direction of the arrows; Fig. 4 is a sectional view on the line 4—4 of Fig. 2, looking in the direction of the arrows, and Fig. 5 is an end view showing the spring means for urging the knife or cutter toward the article to be peeled.

The supporting bracket of the device is shown at 1, the same being preferably constructed from a single piece of sheet metal, as shown. To stiffen and add rigidity to the bracket, several elongated ribs are formed in it, as shown at 2 and 3. At its upper end, the bracket is curled or rolled over to form a tubular guideway 4 for the spindle 9 which receives and rotates the potato or other article to be peeled, and advances it toward the cutter, consisting of the knife 39 and guard 41. At one end of the guideway 4 is attached a strap 6 having upstanding ears in which a latch 7 is pivoted at 8, the purpose of the latch being to normally engage the thread 13 on the spindle 9 and prevent axial movement of the spindle except by rotative movement thereof by means of the crank 18, as will be hereinafter explained.

At its lower end, the bracket 1 is provided with a lip 45 through which a clamping screw 44 is threaded, said screw 44 being provided with the head 43 for engagement against a table top or other support which is thus held between the head 43 of the screw and the surface 42 of the bracket, thus detachably securing the bracket to the table or any other suitable support.

The bracket 1 is provided with a projecting arm 24, which may be formed as an integral part of the bracket or as an element rigidly attached to and thus forming an extending part of the bracket. Pivoted at 27 on the under side of the arm 24, adjacent to its free end, is a member 26 of channel form, said member having downwardly dependent wings 29 and 30 in spaced relation. Attached at 25 to the top of the channel member 26, is a rod-like link 23, which has its opposite end pivotally attached at 22 to one end of a lever 20. Said lever 20 is pivotally mounted at 21 in the bracket 1 and is held spaced therefrom by the bushing 50 (Fig. 4). Pivotally secured to the other end of the lever 20 is the end of a rod-like link 17 which has its opposite end pivotally attached to the lugs 16 of a clamp 15 secured near one end of the spindle 9. The construction just described is such that when the spindle 9 is rotated by turning the crank 18 by means of the knob 19 and is thus moved axially through the guideway 4, the links 17 and 23 and the lever 20, forming a linkage connection between the spindle 9 and the member 26 will turn the member 26 about its vertically disposed pivot pin 27 to allow the knife 39, carried by the member 26, to follow the irregular contour of a potato or other object and peel the same.

The knife 39 is carried on a rod 36 which has its lower end bent laterally and pivotally mounted in the wings 29 and 30 of the member 26, said lower end of the rod 36 being surrounded by a torsional spring 31 which has an end 34a operative against the under side of the member 26 and its opposite end extending upwardly, as at 32, and engaging about the rod 36. This spring 31 thus acts to normally urge the rod 36 inwardly or toward the spindle 9, such inward movement of the rod being limited by the engagement of the rod against a lug 33 on the wing 30 and also against the curved edge 35 of an elevated part of a stop and guide plate 34 secured on top of the arm 24 above the member 26.

The cutting device includes the knife blade 39, which is adjustable longitudinally in a channelled bracket 38 forming an extended part of a boss 37 secured on the rod 36. The blade may be held in any desired position of adjustment by means of a screw 40. At the upper end of the rod 36 is attached a guard member 41 which co-operates with the blade 39 in stripping away a peeling of the desired thickness. The spacing of the cutting blade from the guard member determines the thickness of the peeling cut from the potato or other article being peeled. A screw 48 fixes the guard member 41 on the off-set end of the rod 36.

The end of the spindle 9 is formed with a spit portion 10 of flattened form and provided with a pointed terminal 12 to permit of easy insertion into the potato or the like. The shape of the spit 10 is such that it will hold the object to be peeled against rotative movement relative to the spindle 9. Lateral wings 11 may also be provided along the edges of the flat portion of the spit.

In Figs. 1 and 2 the device is shown in readiness to receive a potato or other object to be peeled. To apply a potato on the spit portion of the spindle, the knife is swung away from the spit against the tension of the spring 31 to render the end of the spit accessible and the potato is then impaled on the spit. The spring 31 will then swing the knife inwardly until it comes into contact with the end of the potato. The crank 18 is then rotated and as the potato is both rotated and advanced, the cutter is swivelled about its vertical axis 27, operating the while against the surface of the potato and removing a continuous spiral peeling therefrom. The spring 31 tends to maintain the cutter in constant contact with the irregular surface of the potato with the proper pressure to cause the cutter to remove a continuous and uniform peeling therefrom. Rotative movement of the spindle 9 is continued until the potato is completely peeled, or until forward movement of the spindle ceases, this occurring when the interrupted portion 14 in the thread 13 reaches the flange 46 of the latch 7 that normally engages the thread 13. The latch 7 is provided with a laterally extended fingerpiece 47 by means of which the latch may be swung upwardly on its pivot 8 to move its edge portion 46 out of the slot 5, thereby enabling the then-advanced spindle 9 to be manually drawn rearwardly through the guideway 4 by direct axial pull, to its initial position as in Fig. 1 in readiness for the placement of another potato on the spit 10.

It will be understood that the latch 7 can be raised or lowered at any time, and in its raised position it is freed from engagement with the threaded portion of the spindle so that at this time, the spindle 9 can be freely moved axially along in the guideway 4. This is of some importance, for in the case of very irregularly shaped potatoes, certain portions of them often require "double peeling" and with this arrangment any area of the potato can be easily re-peeled by merely raising the latch and sliding the spindle along in the guideway 4 to bring the required portion of the potato in a position adjacent to the cutter.

It will also be noted that when no potato is on the spit, inward movement of the knife is restricted by means of the curved edge 35 on the plate 34 so that during demonstration or other operation of the device when no potato is in place, the cutting blade is held away from the spit so that any possible damage to either the cutter or to the spit by contact with one another is prevented.

From the foregoing, it will be apparent that a simple and effective peeling device is provided. The main parts of the device may be stamped from sheet metal; the device is relatively flat and compact for shipping and storage and will speedily peel large quantities of potatoes or other articles in a very short time.

What I claim is:

1. In a device of the character described, a bracket, a spindle rotatively supported therein, a cutter arm, a support for said arm swivelled on the bracket, a lever pivoted to one side of the bracket, a link extending between one end of said lever and the swivelled support, and a second link extending between the second end of the lever and the spindle.

2. In a device of the character described, a bracket having a guide, a threaded spindle operative through the guide, a spit on the spindle, an arm projecting from the bracket, a channelled member pivoted to the under side of the arm, a lever pivoted to one side of the bracket, a link having one end connected to an end of the lever and its other end connected to the channelled member, another link connected to one end of the lever and having its other end connected to the spindle, said channelled member having spaced wings, a cutter support pivotally mounted in the wings, spring means for urging the cutter support toward the spit, and a stop plate fixed on the arm and having a curved edge around which the cutter support moves and which limits the inward movement of the cutter support toward the spit.

3. In a device of the character described, a bracket, an oscillatory cutter arm, a swivelled support for said arm, a crank-operated threaded spindle for turning and advancing the object to be peeled relative to the cutter arm, a lever pivoted on the bracket and having its ends respectively linked to the threaded spindle and the swivelled support whereby said support will be turned under axial movement of the spindle, and a fixed guide member on the bracket around which the cutter arm is moved, said guide member having a surface for limiting the inward movement of the cutter arm.

4. In a device of the character described, a sheet metal bracket having a curled-over upper end forming a tubular guideway, a threaded spindle extending through the guideway, a spit on one end of said spindle, a crank at the other end, a latch pivoted on the guideway and having a part normally in engagement with the thread on the spindle, an arm extended from the bracket, a member pivoted on the under side of the arm, a guide-plate non-pivotally attached to the upper face of the arm above the member, the member having dependent side wings, a rod having a horizontal part pivoted in the wings, a torsional spring for urging said rod toward the spit, a lug on one of the wings for limiting the movement of the rod toward the spit, cutting means carried on the rod, a curved edge on the guide plate against which the rod is held by the spring when no object is on the spit, and linkage between the member and the spindle whereby the member is swivelled on its pivot when the spindle is moved axially and is simultaneously rotated.

5. In a device of the character described, a sheet metal bracket having a curled-over upper end forming a tubular guide, a threaded spindle axially movable through said guide, a latch member straddling the guide and pivoted on the same, the top portion of the guide having a slot through which a part of the latch member is entrant to engage with the threaded part of the spindle, the latch member being provided with a forward flange entering the slot in the guide, said latch member also having a lateral finger-piece disposed along one side of the bracket for permitting pivotal raising movement of the latch member, the threaded part of the spindle being interrupted to thereby halt axial movement of the spindle at the completion of the peeling operation, a cutter, means for swinging the cutter, means for resiliently holding the cutter against the surface of the object to be peeled and a driving connection between the spindle and the cutter.

LOUIS OSKOW.